United States Patent [19]
Dillon, Jr.

[11] Patent Number: 5,083,315
[45] Date of Patent: Jan. 28, 1992

[54] UNISEX SCRUB SHIRT AND METHODS FOR MAKING SAME

[75] Inventor: John L. Dillon, Jr., El Paso, Tex.

[73] Assignee: Johnson & Johnson Medical, Inc., Arlington, Tex.

[21] Appl. No.: 627,084

[22] Filed: Dec. 13, 1990

[51] Int. Cl.$^5$ ............................................. A41D 13/04
[52] U.S. Cl. ............................................. 2/51; 2/114; 2/115; 2/121; 2/125; 2/243 R; 2/243 B; 2/DIG. 7
[58] Field of Search ................... 2/51, 69, 114, 115, 2/121, 125, DIG. 7, 243 R, 243 B

[56] References Cited

U.S. PATENT DOCUMENTS

| | | | |
|---|---|---|---|
| D. 139,484 | 11/1944 | Epstein | D3/25 |
| 412,055 | 10/1889 | Williams | 2/114 |
| 1,202,332 | 10/1916 | Tschirgi | 2/114 |
| 3,052,799 | 9/1962 | Hollands | 250/108 |
| 3,078,467 | 2/1963 | Artzt | 2/114 |
| 3,719,955 | 3/1973 | Hrubecky | 2/243 R |
| 3,720,957 | 3/1973 | Patience | 2/DIG. 7 |
| 3,911,499 | 10/1975 | Benevento et al. | 2/114 |
| 4,215,434 | 8/1980 | Barron | 2/114 |
| 4,473,908 | 10/1984 | Knecht | 2/114 |
| 4,608,719 | 9/1986 | Lunt | 2/DIG. 7 |
| 4,631,756 | 12/1986 | Schrivens | 2/DIG. 7 |
| 4,718,124 | 1/1988 | Sawick et al. | 2/DIG. 7 |
| 4,737,995 | 4/1988 | Wiley | 2/DIG. 7 |
| 4,759,083 | 7/1988 | Belcher | 2/114 |
| 4,783,854 | 11/1988 | Björklund | 2/51 |
| 4,819,275 | 4/1989 | Lunt | 2/114 |

Primary Examiner—Werner H. Schroeder
Assistant Examiner—Gloria Hale

[57] ABSTRACT

Garments are constructed from two identical sleeve sections folded and joined to form an upper portion, which has a neck opening and sleeves, joined to a rectangular lower portion, which forms the body portion of the garment. The upper portion and the lower portion are joined together by a straight circumferential seam. The sleeve sections and the lateral edges of the lower portion are joined by a straight vertical seam. Preferably, the sleeve sections are folded so as to be overlapped and form a neck opening that is V-shaped. In a most preferred embodiment, the garment of the present invention is a scrub shirt. The present invention makes use of sleeve sections that are in the shape of quadrilateral sections with an arcuate portion cut therefrom. The patterns disclosed make efficient use of the material from which they are cut and require only straight seams when assembled. The present invention also discloses methods of constructing garments, such as scrub shirts, in accordance with the disclosed design.

11 Claims, 3 Drawing Sheets

UNISEX SCRUB SHIRT AND METHODS FOR MAKING SAME

The present invention relates to garments worn in hospitals and other medical facilities and, more particularly, to scrub shirts worn by operating room personnel.

BACKGROUND OF THE INVENTION

In order to help constrain the rising costs of medical care, numerous approaches have been taken to reduce the costs of both the goods and services related to providing medical care. Reducing the cost of a single item by even a small amount can lead to tremendous cost savings if that item is used in sufficient quantity and the function of the item is not compromised. These savings permit available funds to be more efficiently spent and thereby benefit both patient and provider.

One area of high volume use is that of hospital garments. A number of specialized garments are available to cover both medical personnel and patients. An example is the "scrub shirt" commonly worn during pre-operative procedures by operating room personnel. After the personnel have scrubbed while wearing scrub shirts and scrub pants, operating room gowns, gloves, caps and other garments are donned. In the course of a typical day, an operating room will utilize dozens of scrub shirts. Typically, the shirts are reusable and are washed after each use and subsequent wearers select a shirt of the appropriate size from a laundered batch. Such fungible use, however, may lead to problems of fit, since operating room personnel come in a wide variety of shapes and sizes. Thus, the supply of laundered scrub apparel must be kept stocked with a wide variety of sizes. It would therefore be desirable to provide a scrub shirt design which is unisex in both sizing and fit. Such a design would be provided in four or five sizes which would provide an acceptable fit on nearly every person, male or female.

Moreover, as pointed out above, it would also be desirable to provide a scrub shirt which could be manufactured with less labor and which makes more efficient use of the garment material, thereby resulting in cost savings. Labor reduction would preferably entail a reduction in the number and complexity of seams without sacrificing the strength of the garment. The strength of this type of garment is an important attribute since repeated washing and wearing will tend to cause inferior designs to fall apart before they have otherwise worn out.

Others have attempted to design garments which are both comfortable and easier to manufacture. For example, U.S. Pat. No. 4,819,275—Lunt discloses a disposable gown for medical patients. The gown disclosed is formed of a substantially rectangular body having two triangularly shaped cutouts which receive the separate sleeve portions. One of the stated objectives of the design disclosed is to provide a garment which is easy to manufacture. Also, U.S. Pat. No. 3,911,499—Benevento et al. discloses a disposable medical gown fashioned from a single piece of material to provide a seamless front. The garment is worn by first placing the arms through the sleeves and then overlapping and fastening the lateral edges of the garment along the wearer's back. Although this design appears to make somewhat efficient use of the gown fabric, the construction required is relatively complex in relation to the sewing required. Finally, U.S. Pat. No. 3,720,957—Patience discloses a conformable disposable garment formed from two portions. The upper portion is in the form of a rectangle having two trapezoids extending from opposite sides and a convex neck hole cut in the center. When folded about its longitudinal axis, the upper portion trapezoids form sleeves and the convex opening becomes an arcuate neck opening. The lower portion of the garment is formed from a substantially rectangular section of material. In the embodiment disclosed, an operating room gown, the garment is provided with an open back, and is closed by overlapping the lateral edges of the garment along the wearer's back. This design provides relatively straight seams, which are easier to sew; however, this design has the disadvantage of wasting portions of the fabric, such as the neck cut-out.

The repeated use which typical scrub shirts undergo dictates a rugged design. Also, since they are worn closest to the skin beneath other garments such as operating room gowns, it is preferable to have seamless shoulders and a lack of ties, fasteners or the like which add complexity and bulk to operating room attire. Therefore, as reflected by the prior art designs discussed above, there is a need for a scrub shirt or other garment which possesses all of these attributes of ruggedness, fit and comfort, but which is also simple and efficient to manufacture.

SUMMARY OF THE INVENTION

Accordingly, it has now been found that a garment which overcomes these limitations and provides the above-described features can be constructed from two identical sleeve sections folded to form an upper portion which has a neck opening and sleeves, joined to a rectangular lower portion which forms the body portion of the garment. The upper portion and the lower portion may be joined together by a substantially straight (circumferential) seam, and, preferably, the other seams of the garment are also substantially straight. For example, a single straight vertical seam (down the back) closes the garment. In a preferred embodiment of the garment of the present invention, the sleeve sections are folded so as to be overlapped and form a neck opening that is substantially V-shaped. In a most preferred embodiment, the garment of the present invention is a scrub shirt.

The present invention makes use of sleeve sections that are in the shape of quadrilateral sections with an arcuate portion cut therefrom. The patterns disclosed make efficient use of the material from which they are cut and provide substantially straight seams when assembled. The sleeve sections are preferably fashioned to have a first edge which forms a part of the straight seam that closes the garment; a second edge, which is substantially perpendicular to the first edge; a third edge, which is arcuate and extends in substantially the same direction as the first edge; a fourth edge, which is substantially straight and lies along part of a tranversal joining the third edge and an extension of the first edge; and a final edge connecting with the first edge, which comprises a substantially straight section generally parallel to an extension of the first edge, and an arcuate section connecting the straight section and the first edge. Most preferably, the sleeve section is folded about an axis connecting the third edge and the arcuate section of the final edge.

The present invention also discloses methods of constructing garments, such as scrub shirts, in accordance with the disclosed design.

DETAILED DESCRIPTION OF THE PREFERRED EMBODIMENTS

Figure 1:
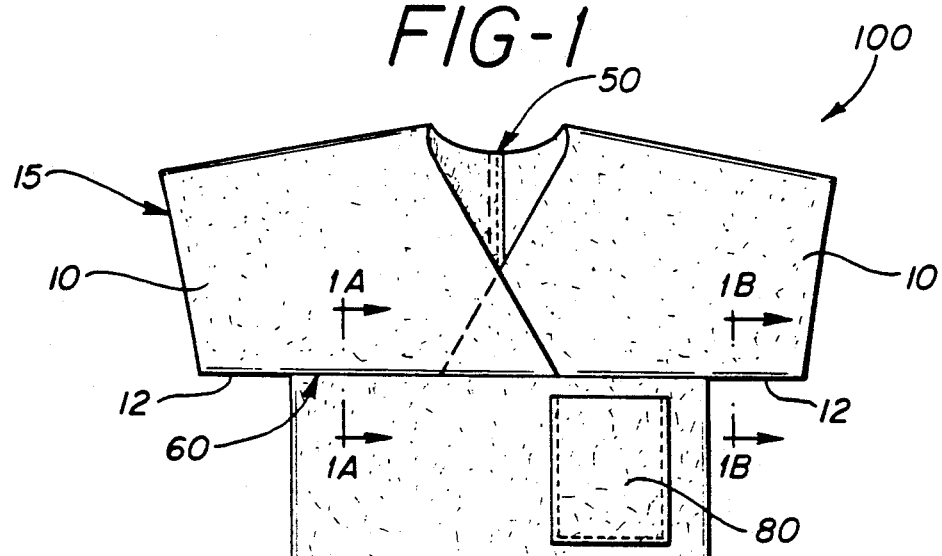
FIG. 1 is a front elevational view of a scrub shirt of the present invention.

Referring now to FIG. 1, there is depicted a scrub shirt 100 made in accordance with the present invention. As seen in front elevation, the scrub shirt 100 is comprised of two different portions of material. The upper portion 15 of the garment comprises two substantially identical sleeve sections 10, which are joined by the upper portion of back seam 50 and by seam 12 to form the sleeves, shoulder and neck portions of the garment. Seam 12 is shown in more detail in FIG. 1B. Sections 10 are also attached by a straight circumferential seam 60, which joins the upper portion 15 to the lower portion 20. Seam 60 is shown in more detail in FIG. 1A. Lower portion 20 is shown to include an optional pocket 80, which optionally uses material that would otherwise be scrapped after a cutting process.

Figure 2:
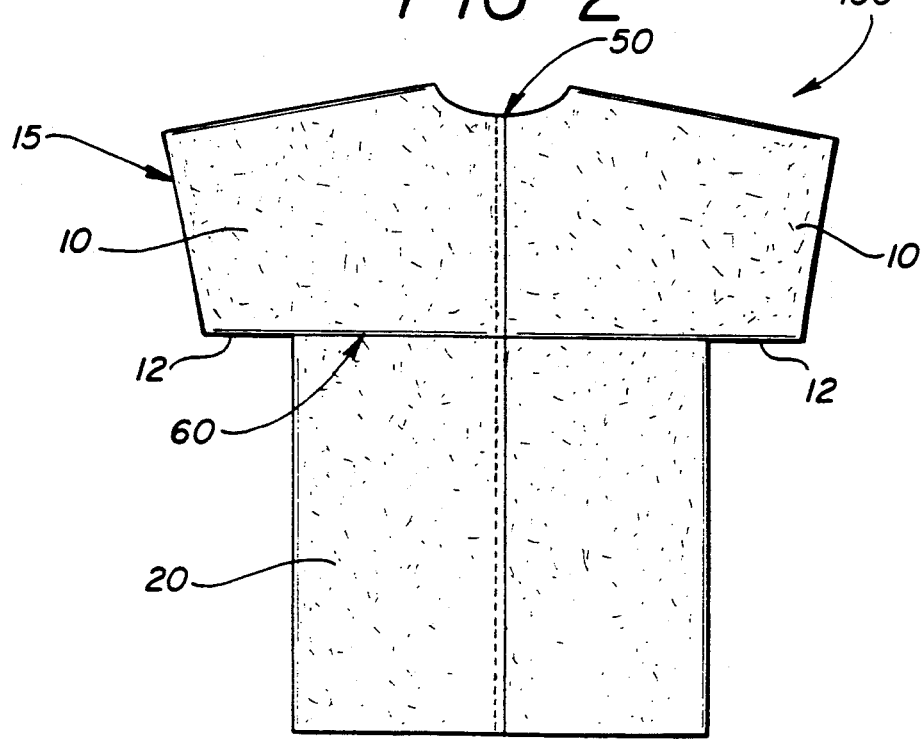
FIG. 2 is a rear elevational view of a scrub shirt of the present invention.

As seen in FIG. 2, the lower portion 20 is formed into a tubular section which covers the lower torso of the wearer after its lateral edges are joined using the lower portion of back seam 50. The garment of the present invention may be formed from any suitable material, either disposable or non-disposable. Additionally, the sleeve sections 10 may be formed from a different material from the lower portion 20. For example, the sleeve sections might be formed from a soft absorbent material for comfort, while the lower portion may be formed of a loose, air permeable material, to allow air circulation.

Figure 3:
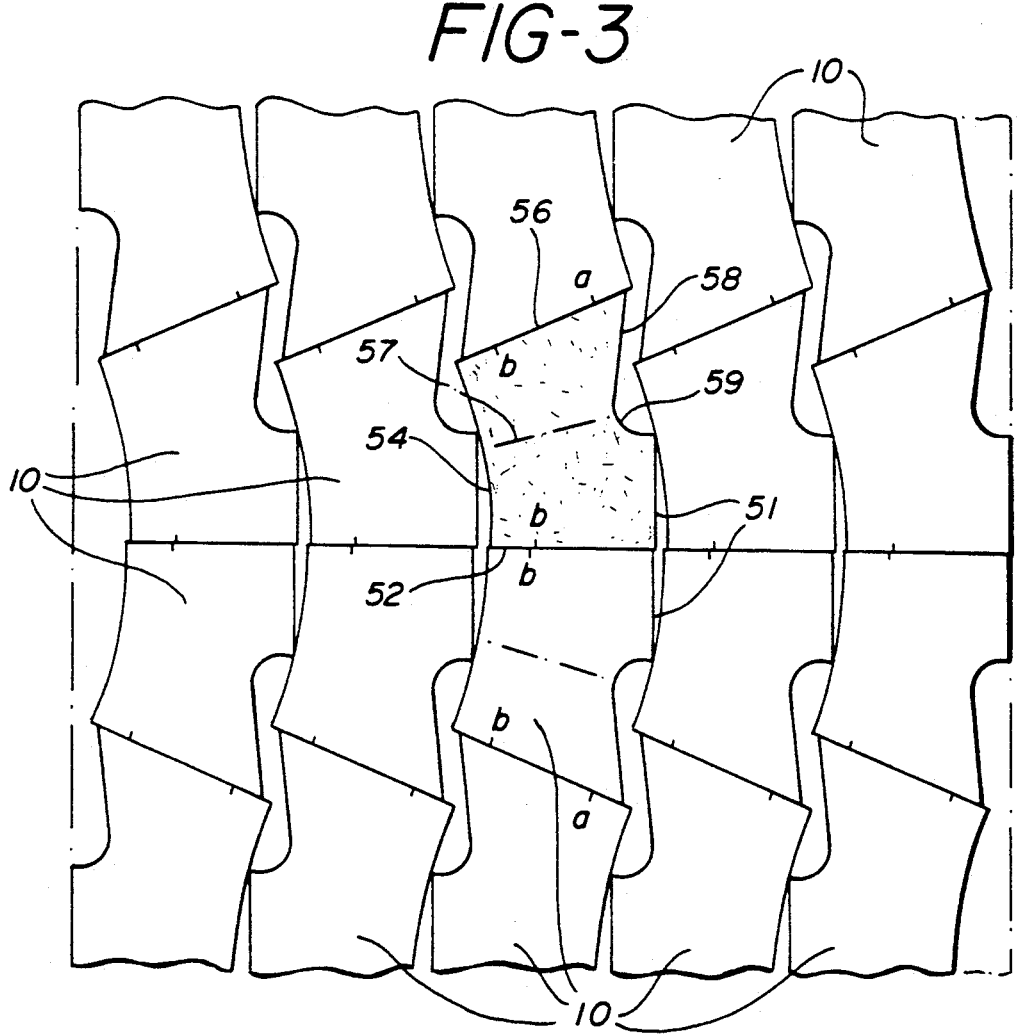
FIG. 3 illustrates a portion of a sheet of fabric having the sleeve portions of the scrub shirt depicted in FIGS. 1-2 laid out thereon.

A section of material illustrating the pattern from which the sleeve section 10 is cut is depicted in FIG. 3. The sleeve sections 10 are symmetrically disposed and oriented such that maximum utilization of the material is achieved. Most preferably, a sleeve section 10 comprises a quadrilateral section with an arcuate portion cut therefrom. In the preferred embodiment illustrated, the sleeve section comprises a first edge 51, which forms a part of the straight back seam 50, illustrated in FIGS. 1 and 2. Referring again to FIG. 3, it will be observed that a second edge of the sleeve section 52 is perpendicular to the first edge 51 and is connected to a third edge 54, which is preferably arcuate, and extends in substantially the same direction as the first edge 51. A substantially straight fourth edge 56 lies along part of an imaginary line that joins third edge 54 with an extension of first edge 51. The orientation of edge 50 relative to edge 54 is selected so that when sleeve section 10 is folded about axis 57, edge 56 lies parallel to edge 52. Lastly, a final edge connects fourth edge 56 and first edge 51 and comprises a substantially straight section 58, which is generally parallel to an extension of the first edge 51, and an arcuate section 59, which connects the straight section 58 and the first edge 51. By "generally parallel" we mean that if extensions of edges 58 and 51 are not parallel, then they meet in an acute angle, preferably less than 45°. As shown by the dashed lines in FIG. 3 and explained below, each sleeve section 10 is folded along axis 57 such that the points "b" are brought together. Point "a" is brought into registration with another portion of the garment, as explained below.

Figure 4:
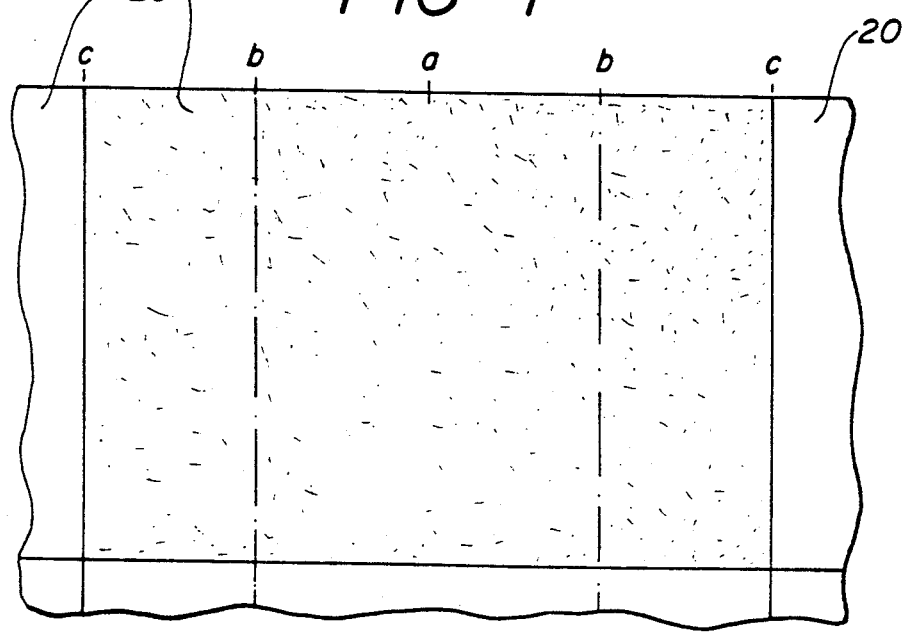
FIG. 4 depicts a portion of a sheet of fabric having the lower section of the scrub shirt depicted in FIGS. 1-2 laid out thereon.

The lower portion 20 of the garment of the present invention is rectangular, as illustrated in FIG. 4. Points "c" identify parallel lateral edges that are connected by a top edge (that passes through the points identified as "c", "b", "a", "b", "c") and a bottom edge opposite the top edge. The dashed lines in FIG. 4 illustrate the approximate fold lines along which the lower portion 20 is folded to form a substantially tubular body portion. The point "a" is at approximately the centerline of the front of the garment and is placed in registration with the point "a" on the sleeve section 10, illustrated in FIG. 3, when the garment is assembled. Points "c" delineate the lateral edges of the lower portion 20 and are brought into substantial registration with each other and are preferably overlapped to form the back seam 50, illustrated in FIG. 2. Preferably, the lower portion 20 is of a length as shown, which is meant to terminate at about the waist or hips of the wearer. However, in certain embodiments, this length may be changed, and in the case of a gown, enlarged to an appropriate length.

Figure 5:
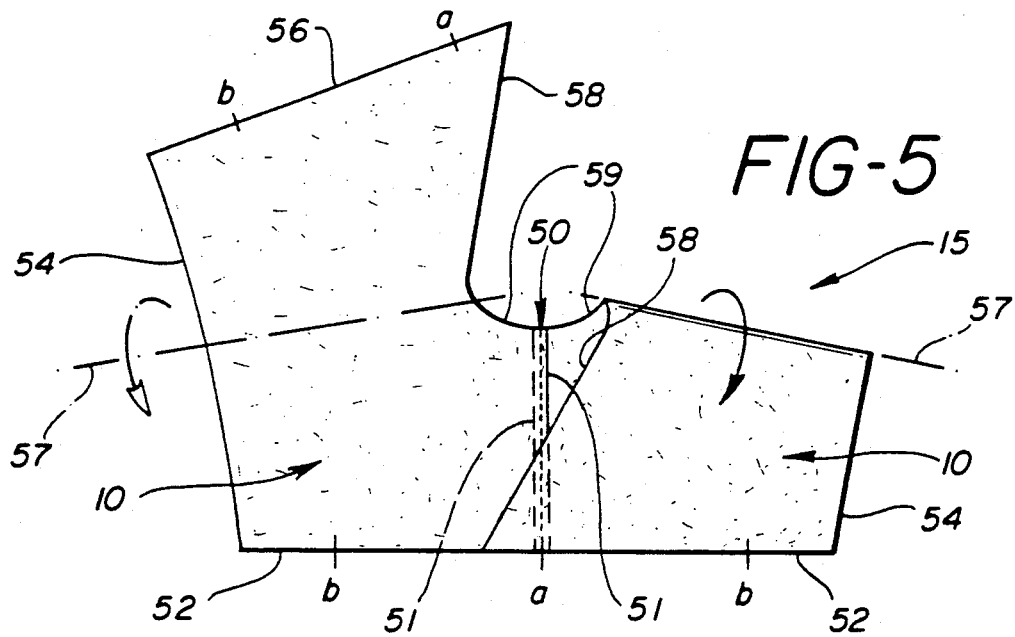
FIG. 5 illustrates the method by which the sleeve sections depicted in FIG. 3 are joined to form the upper section of the scrub shirt depicted in FIGS. 1-2.

The assembly of two of the sleeve sections 10, illustrated in FIG. 3, into the upper portion 15 of a garment of the present invention is shown in FIG. 5. As illustrated, two sleeve sections .10 are positioned with their respective first edges 51 substantially parallel and slightly overlapping and are then folded along the dashed lines 57. As mentioned above, the folding of the sleeve section 10 brings the points "b" into registration; it should also be noted that point "a" on the sleeve section is folded so that it is located at approximately the center of the front of the garment. FIG. 5 also illustrates how the sleeve sections 10, when folded, create a "V" shaped neck opening in the garment and that the sleeves themselves preferably terminate above the elbow of the wearer. Those of ordinary skill will appreciate, however, that by altering the shape of the sleeve section 10, a more arcuate neck opening or longer sleeves may be obtained. Nevertheless, a garment having a "V" neck and short sleeves represents a preferred embodiment of a scrub shirt made in accordance with the present invention. This style of garment has been found to be easy to don and remove and provides a high degree of comfort for wearers of both sexes.

Figure 1A:
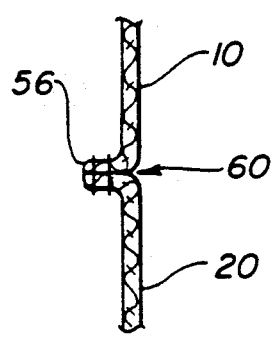
FIG. 1A is a partial cross-sectional view of a circumferential seam, as taken along line 1A—1A of FIG. 1.
Figure 1B:
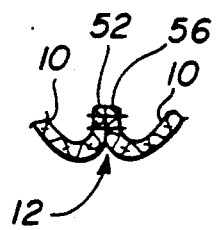
FIG. 1B is a partial cross-sectional view of a distal portion of a sleeve, as taken along line 1B—1B of FIG. 1.
Figure 6:
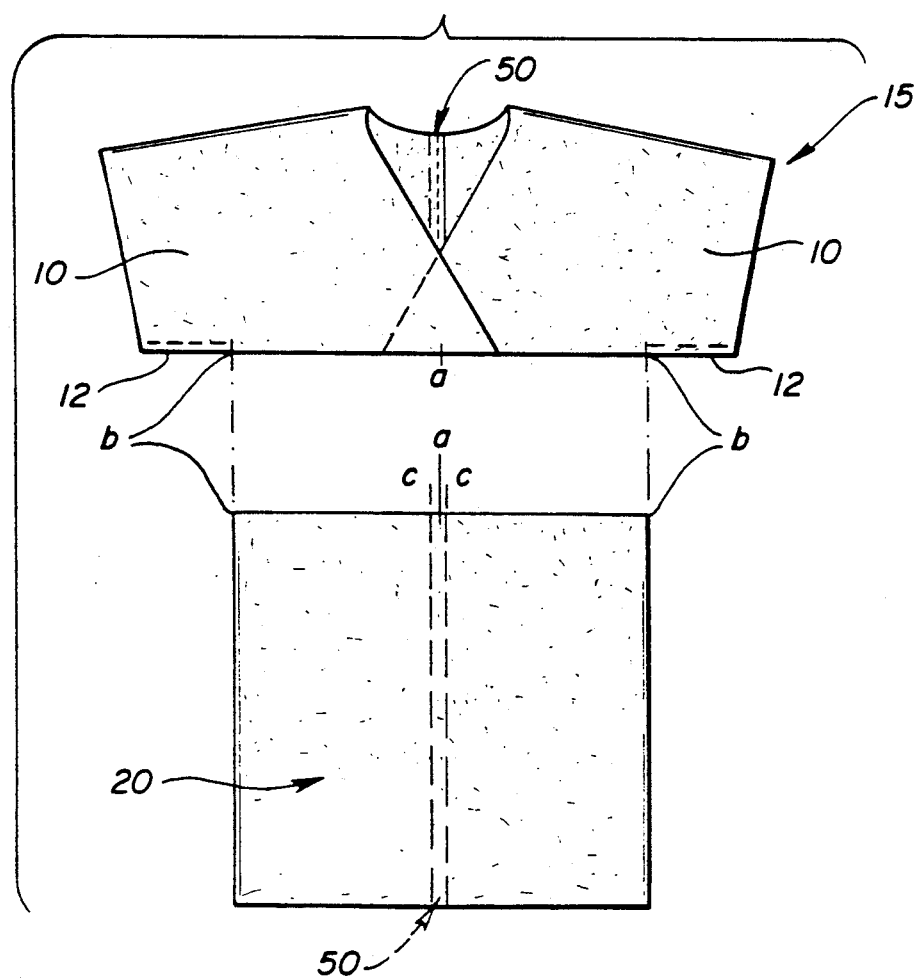
FIG. 6 illustrates the method by which the upper section depicted in FIG. 5 is finished and joined with the lower section depicted in FIG. 4 to form the scrub shirt depicted in FIGS. 1-2.

The final assembly of a garment made in accordance with the present invention is depicted in FIG. 6. Forming the upper portion 15 of the garment is completed by folding the second sleeve section 10, overlapping the neck portion as illustrated to place point "a" of this sleeve section 10 in registration with point "a" of the first sleeve section 10 depicted as being folded in FIG. 5. It should be noted that the upper portion 15, comprising two sleeve sections 10, has a substantially straight lower edge. After aligning points "b" on this lower edge with the corresponding points "b" on lower portion 20 (as shown in FIG. 4), circumferential seam 60 is provided to join the upper and lower portions of the garment. A cross section through seam 60 is shown in FIG. 1A. Sleeve seam 12 joins the distal ends of sleeve sections 10 and is shown in cross section in FIG. 1B. Seams 60 and 12 are substantially collinear. A single straight seam 50 then closes the entire garment.

Although the assembly of a garment made in accordance with the present invention has been described in reference to FIGS. 5-6, those of ordinary skill will understand that the order of assembly described is for illustrative purposes and does not necessarily represent the order in which the sleeve sections 10 and lower portion 20 will be assembled to create a garment such as a scrub shirt 100 in accordance with the present invention. Regardless of the order in which the pieces are assembled, however, it should be noted that the present invention provides a garment design which comprises only substantially straight seams. The design of the present invention thus may be sewn more rapidly and by sewers of lesser skill than other designs. Although sewn seams are preferred, the seams may alternatively be formed without sewing; e.g., using adhesives, tape, sonic welding, or other methods known to those having skill in the art.

The shapes of the pieces (10 and 20) used to make the garment increase the utilization of the garment material. There is very little waste in the sleeve sections 10, as illustrated in FIG. 3, and virtually no waste at all in the rectangular lower portion 20, illustrated in FIG. 4. Therefore, the design of the present invention can be cut and assembled using less labor and less material than other designs, presenting a cost savings and an increase in overall productivity.

Methods of constructing garments comprised of sections of material joined together in accordance with the present invention include the step of providing two identical arm sections of a garment cut from a first section of material. One of the arm sections is then folded to form a first sleeve and a portion of a neck opening and the other arm section is then folded to overlap the first arm section and thus form a second sleeve section and complete the neck opening. A rectangular lower portion cut from a second section of material is then provided. This tubular lower portion is then joined to the sleeve sections by a substantially straight, circumferential seam and the lateral edges of the sleeve sections are joined to form tubular sleeves. A single straight seam joins the two arm sections together and also joins together the lateral edges of the lower portion, thereby completing the garment. Most preferably, the steps of joining the sections comprise sewing a seam. In a most preferred embodiment, the garment constructed in accordance with the methods of the present invention is a scrub shirt having short sleeves and a V-shaped neck opening.

Although certain embodiments of the present invention have been set out in detail, the invention is not limited to these embodiments. Numerous variations to the articles and methods disclosed will immediately present themselves to a person of ordinary skill in the art. For example, variations in the order in which garments are assembled and variations in the exact shape of the sleeve portions will be readily envisioned by those of ordinary skill. Therefore, reference should be made to the appended claims in order to determine the full scope of the present invention.

What is claimed is:

1. A garment comprising two substantially identical sleeve sections folded to form an upper portion, comprising a neck opening and sleeves; and a substantially rectangular lower portion, comprising two substantially parallel lateral edges connected by a top edge and a bottom edge, in which the upper portion and the lower portion are joined together by a substantially straight circumferential seam, and both the sleeve sections of the upper portion and the lateral edges of the lower portion are joined by a substantially straight vertical seam.

2. The garment of claim 1, wherein the sleeves are joined by at least one substantially straight horizontal seam.

3. The garment of claim 1, wherein the sleeve sections are folded so as to be overlapped and the neck opening is substantially V-shaped.

4. The garment of claim 1, wherein the garment is in the form of a scrub shirt.

5. The garment of claim 2, wherein the sleeve section comprises a substantially quadrilateral section with an arcuate portion cut therefrom.

6. The garment of claim 5, wherein the sleeve section comprises a first edge which forms a part of the vertical straight seam; a second edge which is substantially perpendicular to the first edge; a third edge which is arcuate and extends in substantially the same direction as the first edge, a fourth edge which is substantially straight and lies along part of a transversal joining the third edge and an extension of the first edge; and a final edge connecting with the first edge and comprising a substantially straight section generally parallel to an extension of the first edge and an arcuate section connecting the straight section and the first edge.

7. The garment of claim 6, wherein the sleeve section is folded about an axis connecting the third edge and the arcuate section of the final edge.

8. A method of constructing a garment comprised of sections of material joined together, the method comprising the steps of:
   a. providing two substantially identical arm sections of a garment cut from a first section of material;
   b. folding a first arm section to form a first sleeve and a portion of a neck opening;
   c. folding a second arm section to overlap the first arm section to form a second sleeve section and to complete the neck opening;
   d. providing a substantially rectangular lower portion cut from a second section of material and comprising two substantially parallel lateral edges connected by a top edge and a bottom edge
   e. joining the lower portion and the sleeve sections with a substantially straight circumferential seam; and
   f. joining both the arm sections and the lateral edges of the lower portion by a substantially straight vertical seam.

9. The method of claim 8, wherein the steps of joining comprise sewing a seam.

10. The method of claim 8, wherein the garment is a scrub shirt.

11. The method of claim 10, wherein the garment is a scrub shirt having short sleeves and a V-shaped neck opening.

* * * * *